United States Patent [19]

Melvin

[11] Patent Number: 4,819,312

[45] Date of Patent: Apr. 11, 1989

[54] APPARATUS FOR REMOVING BABBITTS FROM KNIVES

[76] Inventor: Randall K. Melvin, 3 Hitching Post Ct., Rockville, Md. 20852

[21] Appl. No.: 128,530

[22] Filed: Dec. 2, 1987

[51] Int. Cl.$^4$ .......................... B23L 1/00; B23P 19/02; B23Q 41/00; B27L 1/00

[52] U.S. Cl. ........................................ 29/56.5; 29/426.4; 29/564.6; 29/809; 51/215 H; 76/101 A; 144/176

[58] Field of Search ................... 29/564.1, 564.6, 56.5, 29/426.4, 809, 283.5; 51/215 H, 3, 5 R; 83/174; 76/101 R, 101 A; 407/53, 60, 61, 114; 144/176, 172 R, 174; 241/294, 93

[56] References Cited

U.S. PATENT DOCUMENTS

| | | | |
|---|---|---|---|
| 2,979,243 | 4/1961 | Moeckel | 29/426.4 |
| 4,082,127 | 4/1978 | Miller | 144/162 R |
| 4,198,883 | 4/1980 | Miller | 144/241 |
| 4,444,233 | 4/1984 | Miller | 144/220 |
| 4,610,065 | 9/1986 | Froh | 29/426.4 |

Primary Examiner—John K. Corbin
Assistant Examiner—Ronald M. Kachmarik
Attorney, Agent, or Firm—Edmund M. Jaskiewicz

[57] ABSTRACT

A machine and process is provided for automatically removing babbitts from flaker knives and the like, molding new babbitts onto the knives and trimming the new babbitts to precise dimensions. The machien has a frame on which is mounted a magazine for storing the knives and a movable transfer plate transfers a knife from the magazine to successive positions for removing the babbitts, forming new babbitts and trimming the new babbitts. The babbitts are removed by a power actuated punch engaging the babbitts while the knife is held in the appropriate position.

31 Claims, 6 Drawing Sheets

APPARATUS FOR REMOVING BABBITTS FROM KNIVES

The present invention relates to the reconditioning of knives mounted in holders in disk flakers and other types of cutting machines, more particularly, to an apparatus for removing babbitts from knives to which babbitts have been attached for accurately positioning the knives in holders and forming and trimming of new babbitts on the knives.

Structural flakeboard is a wood based building panel that is used interchangeably with softwood plywood in most applications. It is produced through the bonding of wood flakes, synthetic adhesive and wax under heat and pressure. Wood flakes are specially generated thin flat pieces of wood with the grain of the wood essentially parallel to the surface of the flake and prepared with the cutting action of the knife in a plane parallel to the grain but at an angle to the axis of the fiber.

To produce the substantial amount of wood flakes that go into structural flakeboard, a machine called a disk flaker is frequently used. The disk flaker essentially comprises a rotating disk which has a plurality of substantially radially extending knives whose cutting edges project above the surface of the disk. Log segments are fed into the face of the rotating disk by specially arranged chain conveyors commonly called the "feed works". The tooth chains grip the ends of the log segments to convey them into the rotating disk of knives. The rate at which the log segments may be fed into the disk is determined by a number of factors, such as disk diameter, disk revolutions per minute, distance of knife projection above the surface, and the number of rays of knives on the disk. Given the appropriate feed works, feed rate and other related factors, flake thickness is determined by the amount by which the knife's cutting edge projects above the surface of the disk face. The greater the knife projection, the thicker the flakes.

The knives are positioned on the face of the disk in holders. The accurate positioning of the knives in the holders which determines the distance at which the edges of the knives project above the face of the disk is determined by shims, called babbitts, which are cast directly into slots located along the back edges of the flaker knives. The babbitts are usually cast from babbitt metal or primarily lead based alloys.

When a set of flaker knives becomes dull from use, they are resharpened by grinding. However, every time a knife is ground, the overall width of the knife blade is reduced. If it is desired to maintain a uniform flake thickness, the old knife babbitts must be removed and replaced with larger babbitts in order to compensate for the reduction in the width of the knife resulting from the grinding proces. At the present time, knife babbitts are removed from the flaker knives manually using a hammer and a punch. This is a very laborious and time consuming task. After the old babbitts are removed, new babbitts are formed by pouring babbitt metal into a mold positioned around the knife babbitt slots, also known as babbitt locks. The purpose of the new babbitt is to provide sufficient material so that after shaving of the babbitt the width of the knife blade plus the babbitt will be maintained at the previous predetermined distance. The shaving of the babbitt is the process of precisely trimming the knife plus babbitt dimension to the exact width by removing material from the back edge of the babbitt. Both the pouring of new babbitts and the trimming of the babbitts are also carried out manually.

It is therefore the principal object of the present invention to provide a new and improved apparatus for removing babbitts from knives.

It is another object of the present invention to provide a new and improved apparatus and process for the removing of babbitts from knives, for the forming of new babbitts on the knives and for trimming of the newly formed babbitts to predetermined dimensions.

It is the further object of the present invention to provide an apparatus for the removing, pouring and trimming of babbitts which significantly reduces the time and effort required and reduces the costs involved in performing these operations on knives for flakers and other cutting machines.

It is an additional object of the present invention to provide such an apparatus which is reliable and accurate in its performance and which is capable of long periods of operation with a minimum of maintenance.

The objects of the present invention are achieved and the disadvantages of the prior art are eliminated by the apparatus of the present invention for removing babbitts from knives to which babbitts have been attached for accurately positioning the knives in holders and the like on flakers and other cutting machines. Such an apparatus may comprise a frame and means on the frame for storing a plurality of knives each of which has at least one babbitt attached thereto. The frame is also provided with means for transferring a knife from the storing means to a first predetermined position on the frame away from the storing means. There is means on the frame for removing babbitts from the knife in the first predetermined position.

The frame may further be provided with means for retaining the transferred knife in the first predetermined position. The frame may also be provided with a second predetermined position to which a knife from which babbitts have been removed is transferred. At the second position there are means for forming at least one new babbitt on the knife. There may be a third predetermined position on the frame to which a knife having newly formed babbitts is transferred and at this third position the new babbitts are acted upon by a device for trimming the babbitts.

According to the present invention, a process for removing babbitts from knives to which babbitts have been attached for accurately positioning the knives in holders and the like may comprise the steps of securing a knife which has at least one babbitt attached thereon in a predetermined position. A force is applied against the babbitts to remove the babbitts and new babbitts are then formed on the knife such that the combined width of the knife and new babbitts corresponds substantially to a predetermined distance. The new babbitts are then trimmed to the predetermined combined width of the knife and babbitt in order to accurately and properly position the knife in a holder.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
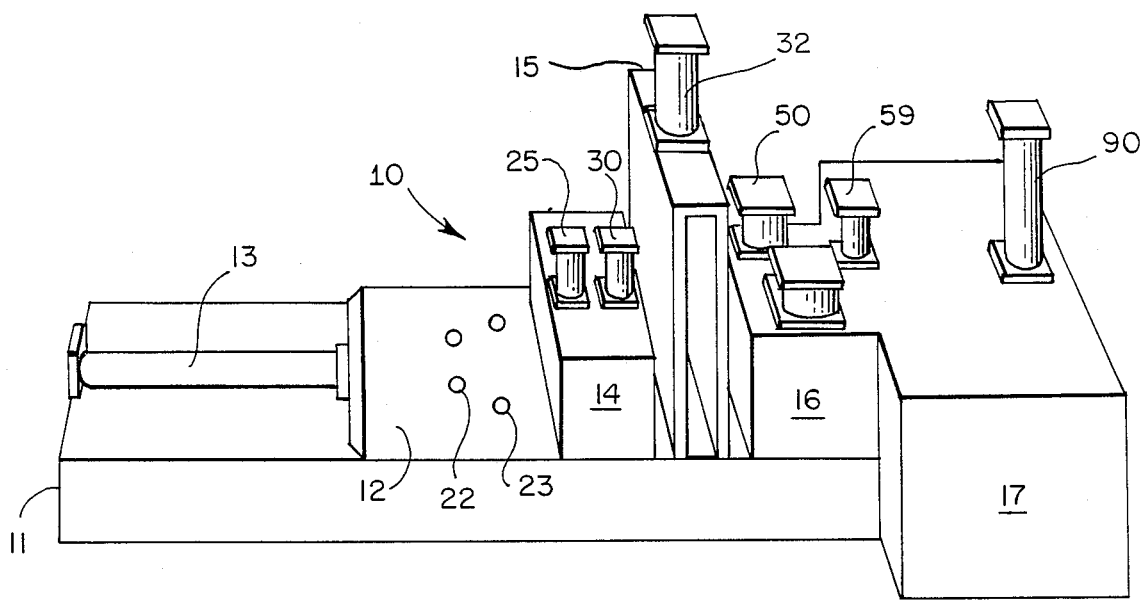
FIG. 1 is a perspective view of the apparatus according to the present invention with the knife transfer plate in its fully retracted position.
Figure 2A:
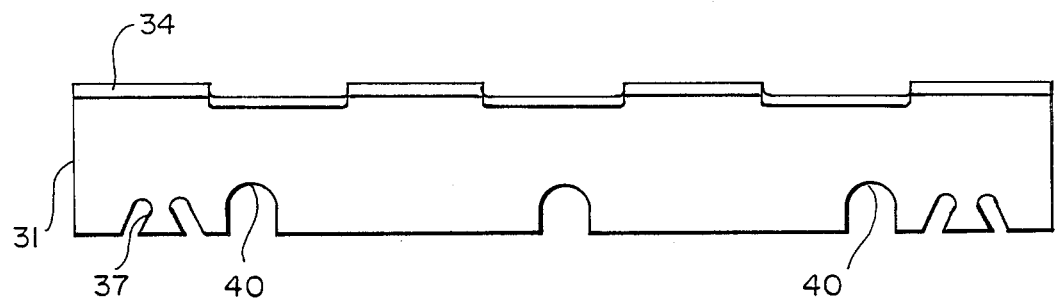
FIG. 2A is a top plan view of a disk flaker knife with a maximum width.
Figure 2B:
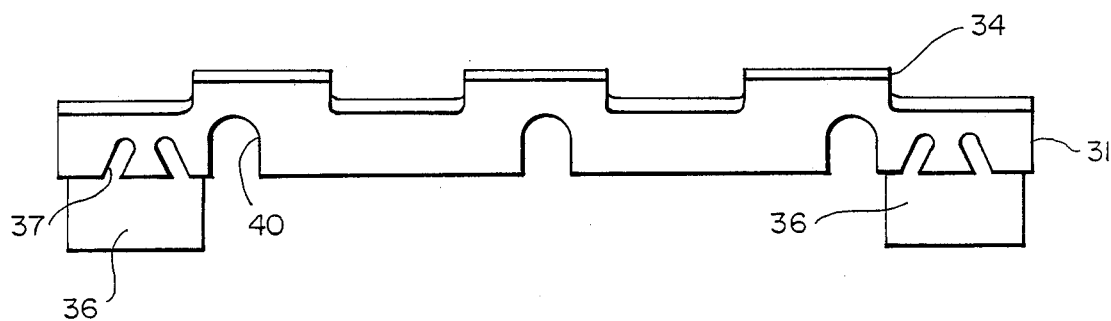
FIG. 2B is a top plan view of a disk flaker knife which has been resharpened numerous times and to which babbitts have been attached.
Figure 3:
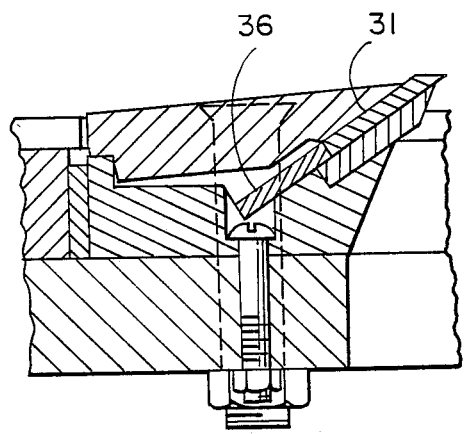
FIG. 3 is a sectional view through a portion of a disk of a flaker showing the mounting of a knife with babbitt attached in a holder.

In FIG. 1 there is indicated generally at 10 an apparatus according to the present invention for removing babbitts from knives, forming new babbitts and for trimming the new babbitts. The machine 10 comprises a frame 11 upon which is slideably mounted a knife transfer plate 12 actuated by a pneumatic or hydraulic cylinder 13 as a liear actuator. There is also mounted on the frame 11 an assembly 14 for locking the knife transfer plate in positions for molding the babbitt and for trimming the babbitt. At 15 there is a magazine for retaining a plurality of vertically stacked blades which are to be processed. There is further an assembly 16 for punching the babbitts to remove them from the knives and for clamping the knife in position for trimming. At 17 there is an assembly for molding and trimming of babbitts.

Mounted upon the frame 11 in a substantially horizontal position is a base plate 18 upon which the knife transfer plate 12 is slideably supported for movement between retracted and extended positions. Extending transversely across the frame and spaced above the base plate 18 to form a space through which the transfer plate 12 can move is a locking guide cover 19 which is a component of the transfer plate locking assembly 14. The transfer plate is also guided along its lateral edges by guide rails 87 the ends of which can be seen in FIG. 7.

Figure 5:
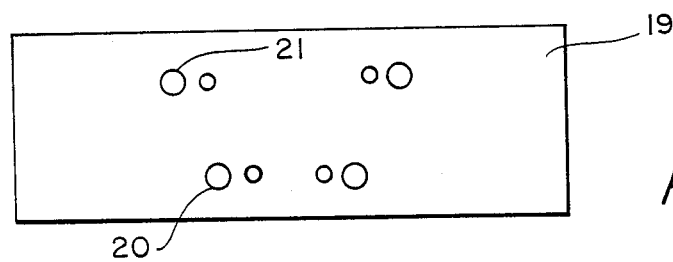
FIG. 5 is a sectional view taken along the line V—V of FIG. 4 and showing a top plan view of the locking guide cover.
Figure 6:
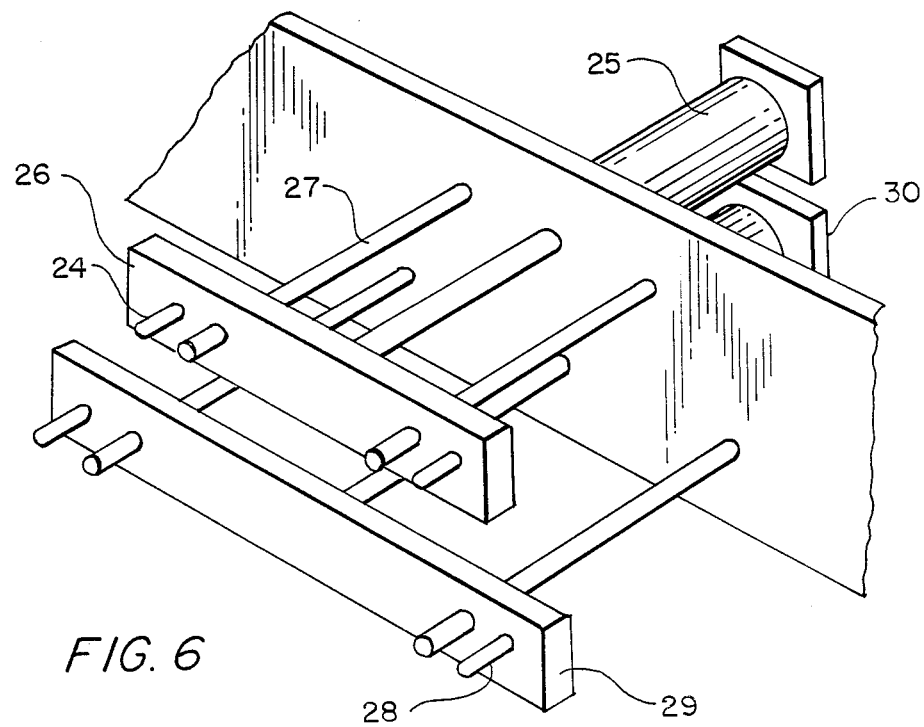
FIG. 6 is a perspective view of a portion of the assembly for locking the knife transfer plate in positions for pouring and for shaving.

The locking guide cover 19 which may be seen in greater detail in FIG. 5 comprises a first pair of holes 20 and a second pair of holes 21. These holes correspond in spacing to holes 22 and 23 on the transfer plate 12. The holes 20 are for receiving locking pins 24 which are vertically moveable under the action of a power actuated cylinder 25 which may be either pneumatic or hydraulic. The pins 24 are mounted on a base 26 which in turn is vertically guided by the rod guides 27. To perform a locking function the pins 24 pass through the openings 20 until they engage the corresponding openings 22 in the transfer plate to lock the transfer plate in the proper position so that a knife being advanced by the transfer plate, in a manner presently to be described, is positioned for the forming of a babbitt.

In a similar manner, locking pins 28 on a base 29 are actuated by a power cylinder 30 to pass through openings 21 in the guide cover 19 to engage the openings 23 in the transfer plate 12 to lock the transfer plate in a proper position so that a knife transferred by the transfer plate is in position for trimming of babbitts.

It is to be understood that the embodiment disclosed herein utilizes a double acting pneumatic cylinder for moving the transfer plate 12. However, a hydraulic cylinder, a four-positioned multi position pneumatic cylinder, a stepper motor screw drive linear advance or other like devices and sensors or switches can be used to actuate the knife transfer plate. Since these modified actuating structures can more precisely position the transfer plate, the locking assembly 14 could be eliminated and replaced by any of the above described modifications.

Figure 4:
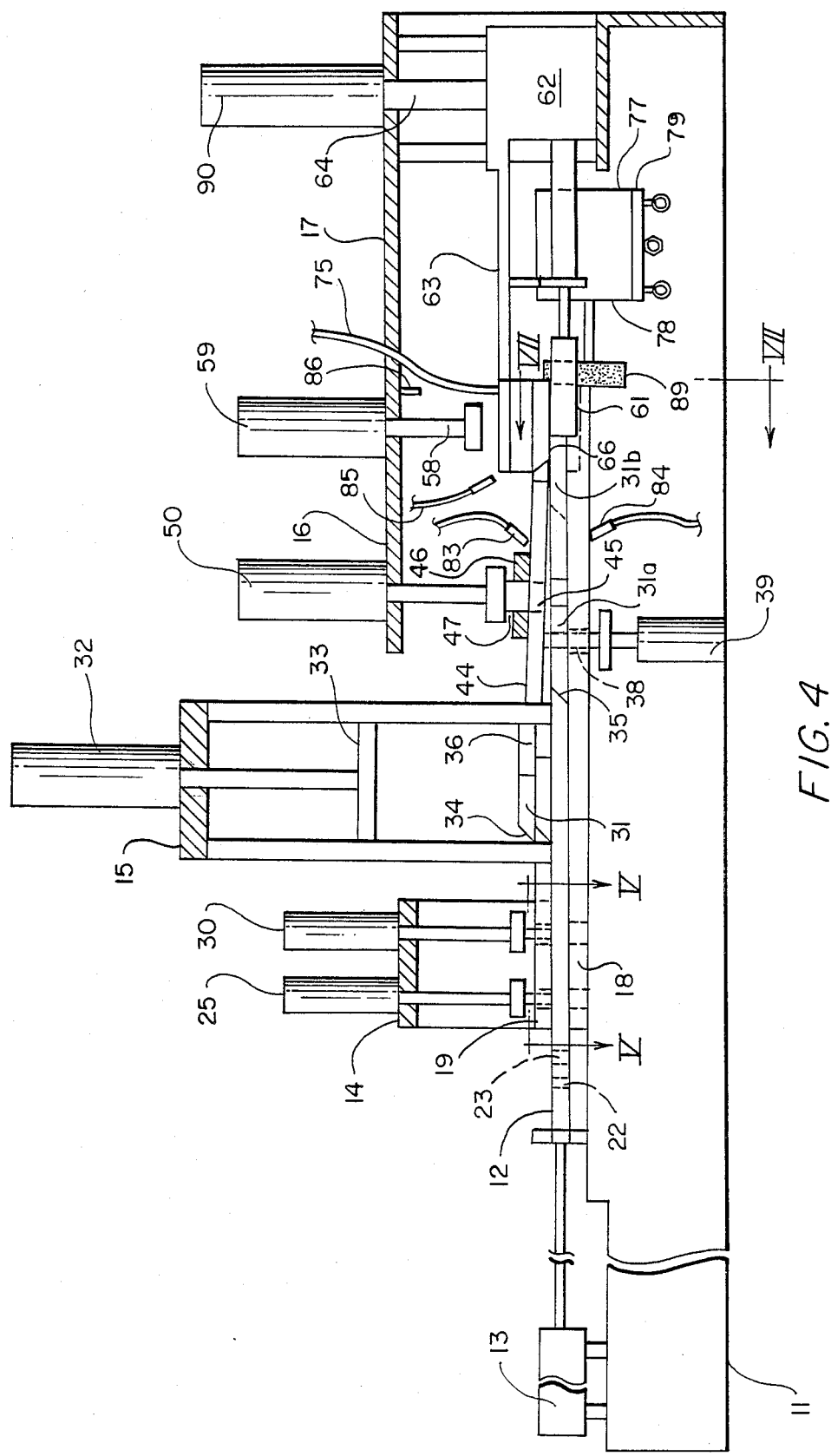
FIG. 4 is a side elevational view of the apparatus of FIG. 1 with portions of the sides removed to show details of construction.

Proceeding along the path of movement of the transfer plate 12 as its moves on the frame from its reacted position at the rear of the apparatus or left as viewed into FIG. 4, there is mounted on the frame the magazine 15 in which a plurality of knife blades 31 each having a babbitt thereon are vertically stacked. The blades in the magazine may be urged downwardly by a power cylinder 32 which acts against the top-most blade by pusher plate 33. The power actuated cylinder 32 may be replaced by a spring powered or other known form of apparatus to assist in the vertical downward feed of the knife blades.

Since the knife transfer plate 12 must move upon the base plate under the weight of all of the knives 31 stacked in the magazine 15, it is preferable that small roller bearings, air cushions or other like devices be employed between the transfer plate 12 and the base plate 18 as well as on top of the transfer plate to facilitate movement of the transfer plate along its path.

The knife blades 31 are stacked vertically each with its bevel edge being directed rearwardly and upwardly as may be seen in FIG. 4 so as to be engaged by the corresponding bevel edge 35 on the transfer plate 12. Each knife 31 has babbitts 36 which are positioned toward the forward direction of the machine as may be seen in FIG. 4.

As the transfer plate 12 is being extended toward the forward or right-hand end of the machine as seen in FIG. 4 its bevel edge 35 will engage bevel edge 34 of the lowermost knife blade 31 in the magazine and slide this knife blade along the base plate 18 through a space between the bottom edge of the magazine and the base plate. This bottom edge may be provided with slightly widened portions at the locations of the babbitts since occasionally the babbitts may protrude above the thickness of the knife blade.

The flaker knives 31 are usually provided at their rear edges with sets of angularly arranged slots 37 for retaining babbitts 36 to the knife blade. These slots may be arranged and spaced differently on knives made by different manufacturers but they all perform the same function. The babbitt 36 is essentially a shim to compensate for material that has been ground off the front edge 34 of the knife during resharpening. The presence of the babbitt provides a constant knife plus babbitt width dimension and thereby enables the knife to project a proper distance above the flaker disk and to obtain the desired flake thickness. The babbitt is usually formed of the soft metal alloy known as "babbitt metal" which consists of a mixture of tin, copper and antimony or a primarily lead based alloy which has been poured and solidified in a predetermined pattern into and around the babbitt slots 37 on the back edge of the knife. Suitable synthetic plastic materials may also be used to form the babbitts.

Proceeding along the path of movement of the transfer plate 12, there is next the punch assembly 16 and a knife blade 31a is illustrated in FIG. 4 in the position for punching or removal of the babbitts. The blade 31a is stopped in this position by a pair of stops 38 actuated by a power cylinder 39 located below the base plate 18. The stops 38 are urged upwardly through similarly shaped openings in the base plate 18 to project in the path of the knife being transferred and to engage in slots 40 on the rear edge of the knife. The faces of the stops directed toward the rear of the machine are tapered and undersized to provide play or allowance to enable positioning of the knives whose slots 40 may vary somewhat from specific manufacturing tolerances.

Figure 7:
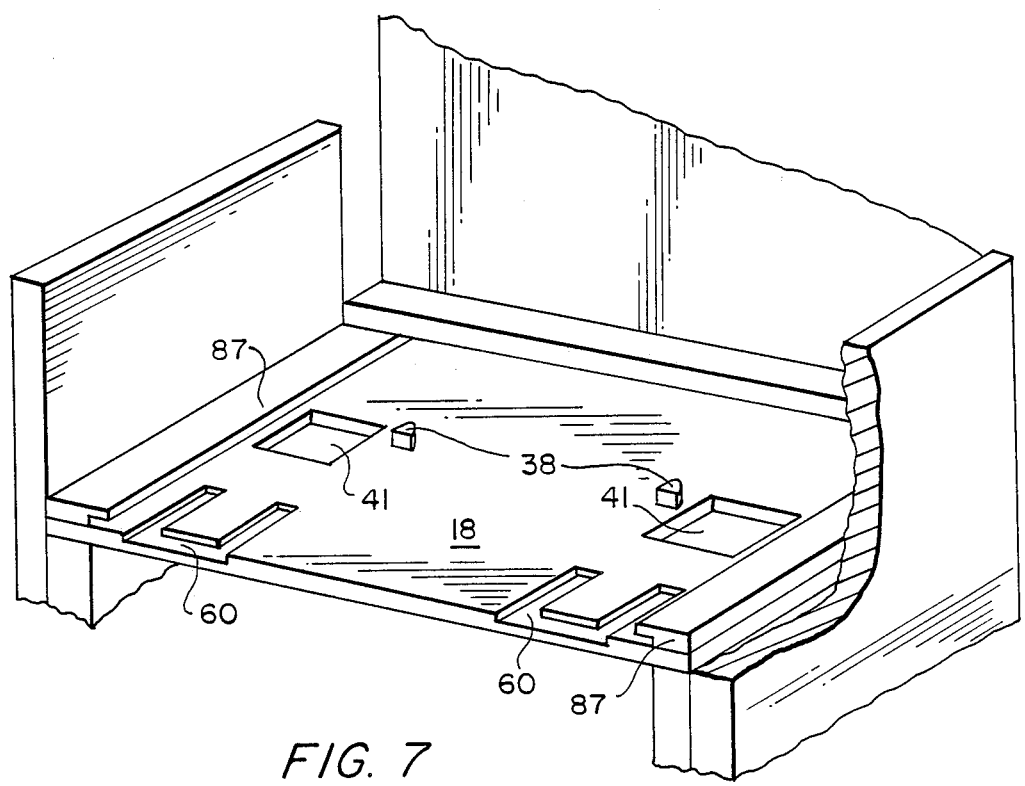
FIG. 7 is a top view in perspective of the base plate at the forward end of the machine showing the location of the knife stops, babbitt removal openings, and 'U'-shaped recesses.
Figure 7A:
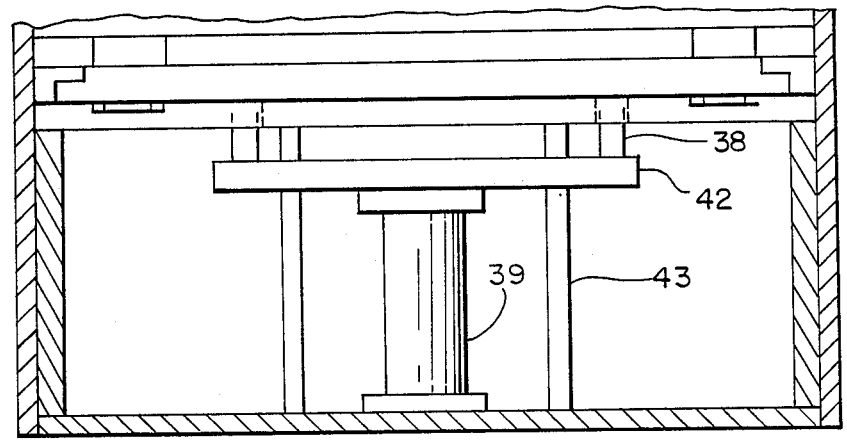
FIG. 7A is a sectional view taken along the line VII—VII of FIG. 4 and showing the cylinder for actuating the knife stops.

As may be best seen in FIG. 7, the base plate 18 is also provided with openings 41 which correspond with the positions of the babbitts on the knife 31a stopped in the punching position.

The knife stops 38 are mounted upon a base member 42 whose vertical movement is guided by guiderods 43 extending vertically.

Figure 8:
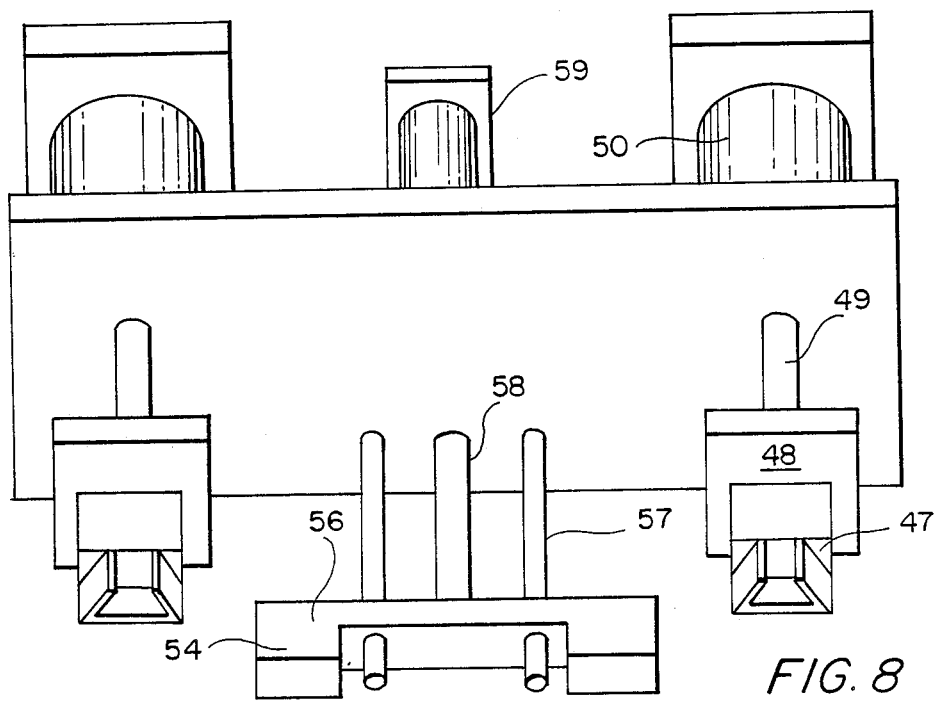
FIG. 8 is a perspective view showing the babbitt punches and clamping blocks for holding the knife in the shaving position.

Positioned on the frame above the punch position of the knife 31a is a plate member 44 having a pair of openings 45 therein corresponding with the locations of the babbitts on the knife blade 31a. The openings 45 are surrounded by guides 45 for guiding the vertical movement of a pair of punches 47 as they decend vertically to apply a force upon the babbitts attached to the knife to separate the babbitts from the knife. The punches 47 which are shown in FIG. 8 have shapes roughly corresponding to the size and shape of the slots 37 in the rear edges of the knife but the punches are undersized to allow for variations in the babbitt locations with respect to the babbitt punch location. The punches 47 are mounted on bases 48 located at the ends of actuating rods 49 which are actuated by power cylinders 50 which may be solenoids, double-acting pneumatic or hydraulic cylinders. While each punch is provided with a power cylinder, a modification may include both punches mounted on a single base member which in turn is actuated by a single power cylinder.

When the punches 47 are extended, they will engage the babbitts 36 and punch the babbitts from the slots at the ends of the knife blades and the separated babbitts will then descend through the openings 41 in base plate 18 to a suitable collector.

Figure 9:
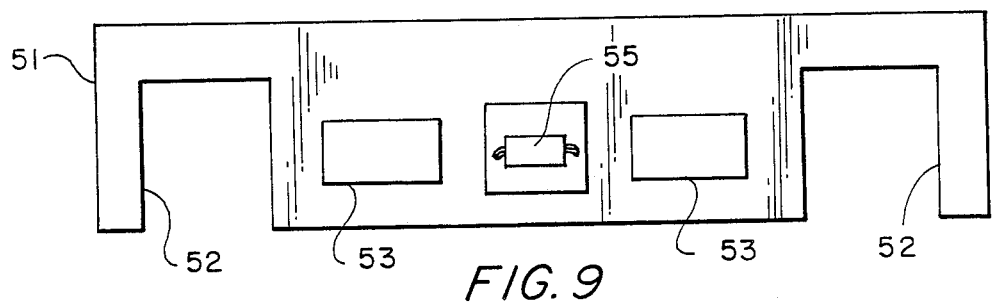
FIG. 9 is a bottom plan view of the guide plate positioned over the front end of the base plate of the machine.

After the babbitts have been removed, the knife is then transferred along the base plate 18 underneath a guide plate 51 shown in greater detail in FIG. 9. This guide plate is provided with a pair of notches 52 to accommodate the molds in a manner that will be presently described and a pair of openings 53 through which clamp blocks 54 are positioned to secure the knife in position for a subsequent trimming operation. The underside of the guide plate is provided with a spring biased friction roller 55 which engages the upper surface of a knife 31 being moved into position for trimming of the babbitt. The friction roller 55 functions as a brake to prevent movement of the knife past its trimming or shaving position.

The clamp blocks 54 are mounted on the underside of a base 56 vertically guided by guide rods 57. The base 56 is on the end of an actuating rod 58 extended and retracted by a power cylinder 59.

Figure 10:
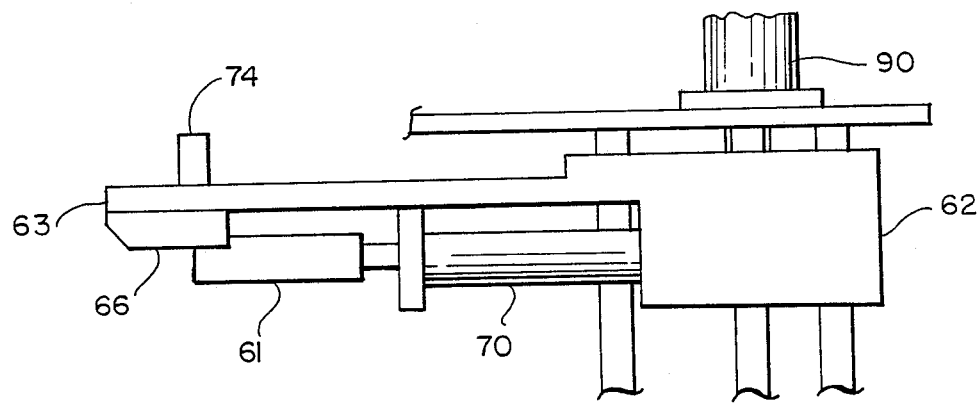
FIG. 10 is a side elevational view of the mold assembly.
Figure 11:
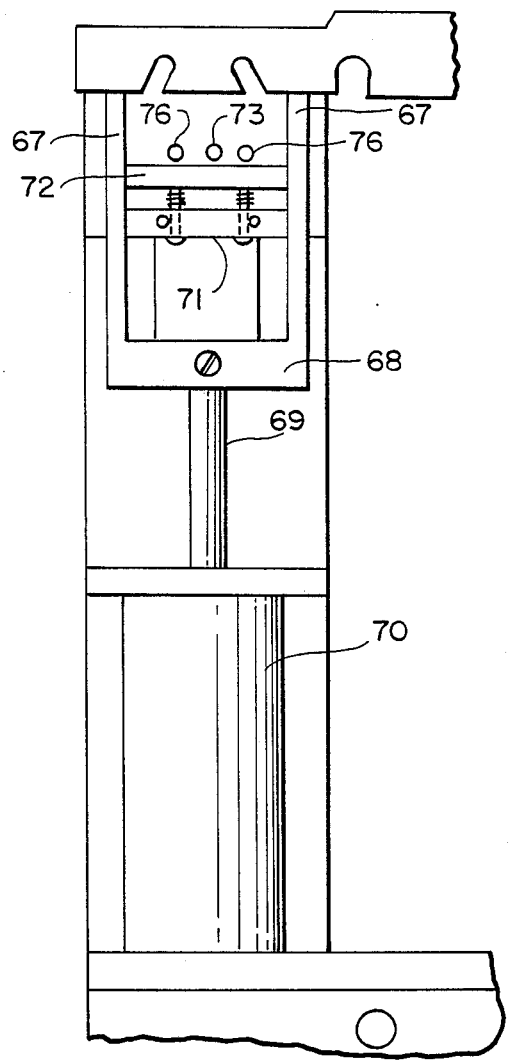
FIG. 11 is a bottom plan view of a portion of the mold assembly showing a mold and its attached actuating cylinder.

On the upper surface at the end of base plate 18 there are provided a pair of U-shaped recesses or grooves 60 to receive a corresponding shape mold 61 seen in FIGS. 10 and 11. The mold 61 is a component of a mold assembly 62 located within the molding and shaving assembly housing 17 and comprising a base element 63 attached to the end of an actuating rod 64 powered by an actuating cylinder 90.

The mold 61 is slideably mounted within grooves on the underside of a head plate 66 which in turn is attached to the underside of the base element 63. The mold 61 comprises a pair of spaced parallel side rails 67 interconnected at their inner ends by a connecting member 68 attached to the end of an actuating rod 69 extending from a powered actuating cylinder 70. Inwardly of the connecting member 68 is a second member 71 extending between the side rails 67. Spring mounted on the second member 71 is a rear edge rail 72 which defines the rear of the babbitt mold. The rear edge rail 72 is mounted upon suitable guide rods to permit movement of the rear edge rail 72 between the side rails 67.

As may be seen in FIG. 11, there is an opening 73 extending through each head plate 66 and the base element 63 and having a pipe or other suitable connector 74 attached thereto as shown in FIG. 10. The nipples 74 are then connected to an injection machine or other machine functioning as a source of the babbitt material. Preferably flexible lines extend from the nipples 74 to the injection machine to permit the raising and lowering of the pouring assembly and these flexible tubes are preferably heated to prevent solidification of the babbitt material in the flexible supply lines 75.

The opening 73 is preferably in the center of the mold adjacent the rear edge rail 72 as seen in FIG. 11. On both sides of the opening 73 are vent orifices 76 for venting air from the mold as a babbitt material is being introduced in the mold.

Figure 12:
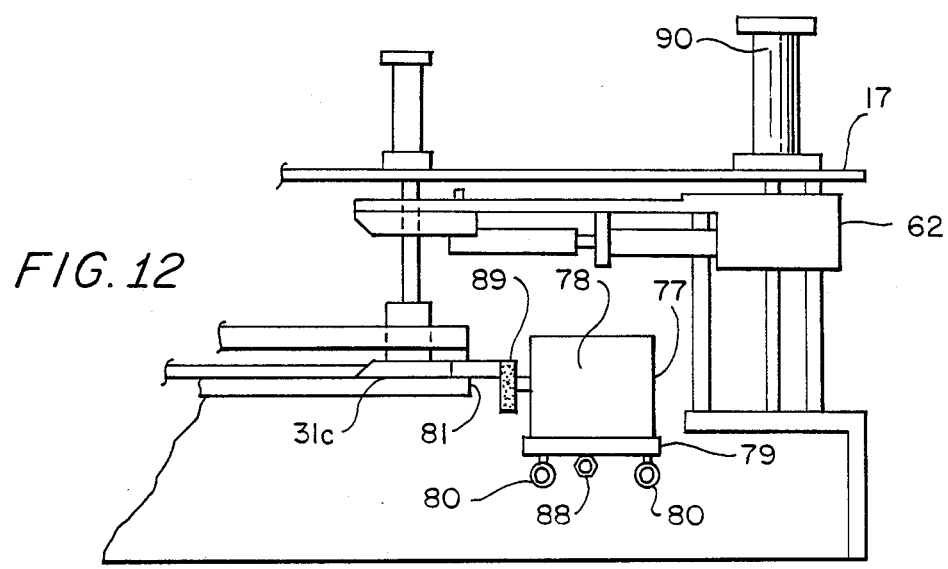
FIG. 12 is a side elevational view with the side cut away of the front or right end of the machine as seen in FIG. 4 and showing the mold assembly in its retracted position and the shaving assembly in its operation position.

The mold assembly 62 is shown in its extended or molding position in FIG. 4. In FIG. 12 the mold assembly 62 is raised or retracted by a power cylinder 90 to permit trimming of the rear edges of the newly formed babbitts by a shaving assembly 77. The shaving assembly 77 consists of a motor 78 driving router or cutting bit 89 mounted upon a platform 79 which in turn is slideably mounted on a pair of horizontal shafts 80. A threaded spindle 88 is attached to the bottom of platform 79 by a threaded nut such that rotation of the spindle shaft 88 by a power source which may comprise a motor will move the shaving assembly 77 along the shafts 80 along a path transverse to the movement of the transfer mechanism within the apparatus.

A knife blade 31c is shown in shaving position and has been moved to this position by the transfer plate 12 in a manner as described above. The clamping blocks 54 are moved downwardly by the power cylinder 59 to clamp against the upper surface of the knife blade 31c. The knife at 31c is so positioned that its babbitts project over the front end 81 of the base plate 18. At the same time, the knife at 31c is clamped in such a position that the router bit 89 will shave off only enough of the back edges of the babbitts so that the overall width of the knife plus the babbitt is a predetermined dimension. Fine adjustments in knife plus babbitt which can be made by releasing a locking mechanism turning a machine feed screw which moves the router back and forth on its base and then relocking the machine screw in the desired position.

After completion of this shaving operation with the router positioned off to the side and the clamping blocks retracted, the transfer plate 12 is moved to its fully extended position and at the same time will push the knife blade from its position at 31c over the front edge 81 of the base plate onto a chute or conveyor and from there transferred to a collection box. Care should be exercised to utilize a chute or conveyor of rubber or a like soft material so that dropping of the knife thereon will not damage or dull in any way the cutting edges of the knives.

While not described herein, all of the power actuated cylinders are operated by a suitable control circuit as known in the art so that each power cylinder acts at a predetermined sequence in the operation to perform its intended function.

With the structure of the machine in mind as disclosed above, the general operating cycle for this machine will now be described.

The resharpened knives with the babbitts are still attached are stacked in the magazine 15. The cylinder 32 on the magazine 15 is then actuated to urge the platform 33 against the topmost knife and thereby compress the knives to a small degree against the base plate 18 upon which they are stacked.

Cylinder 39 is then actuated to extend the knife stops 38 above the surface of the base plate 18 as shown in FIG. 7. Cylinder 13 is then actuated to extend the knife transfer plate 12 so that its leading edge 35 engages leading edge 34 of the lowermost knife in magazine 15 and slides this knife along the base plate 18 until the knife abuts the raised stops 38. Cylinders 50 are then actuated to extend the punches 47 which pass through the guides 46 to apply a force against the babbitts on the knife in position 31a. The punches 47 are then retracted. The removed babbitts fall through the openings 41 into collection boxes located below the machine 10. If the babbitts are made of a recyclable material, they will be remelted and the melted material will then be used to form new babbitts.

At this stage of the operating cycle, an automatic valve now opens to allow compressed air to blow from the nozzles 83 and 84 on the top and bottom of the babbitt slot areas of the knife in process. The purpose of the air is to remove any residual moisture which may remain on the knife from the grinding process. Preferably such a valve stays open and air blows on the knife for a predetermined period of time established by a timing device which then automatically closes the valve.

The knife transfer plate 12 is then shifted to neutral by opening both cylinder ports of the cylinder 13 to atmosphere. This will avoid a force being exerted on the knife stops 38. Cylinder 25 is then actuated to lower the knife transfer plate locking base 26 for molding. The mold assembly 62 is then lowered by actuating the cylinder 90 until the fully extended side mold rails 67 are seated in the recesses 60 on the base plate 18 and held firmly in these recesses. The babbitt mold cylinders 70 are shifted to the neutral position. The knife stops 38 are retracted and the knife transfer plate 12 is extended under the action of cylinder 13 until the locking pins 24 for molding pop into the corresponding locking holes 22 in the transfer plate 12 to stop and lock this transfer plate in position. As the knife transfer plate 12 extended, the back edge of the knife from which the babbitts had just been removed is now pushed against the ends of the mold side rails 67 to retract them to the extent necessary to form the appropriate size of mold pocket for the knife. As the back edge of the knife was forced against the front edge of the mold side rails, the upper surface of the knife slid underneath the mold raising the mold up but not out of the mold recesses 60. The mold side rails 67 are extended to form a tight seal with the back edge of the knife. By injection or gravity feed, a babbitt material is then introduced into the molds through the flexible lines 75. The pressure of injection or the gravity feed provides a sufficient force to fill the molds but not enough to compress the spring loaded back edge 72 of the mold. Suitable sensors are provided to detect when the molds are full and thus stop the flow of babbitt material. Automatic valves are now opened to enable compressed air to blow onto the molded babbitt through air nozzle 85 to expedite cooling and solidification of the babbitt. In the event a thermal setting resin or powered metal was used to form the babbitts, the moulds would have to be heated to cure the resin or melt the metal powder before cooling. As viewed from underneath in FIG. 11, the position of the mold against the rear edge of the knife to form a mold cavity is clearly shown.

The mold side rails are now retracted shearing them from the sides of the newly form babbitt. The cylinder 13 actuating the knife transfer plate 12 is again shifted to neutral and cylinder 25 is actuated to raise the pouring locking pins 24 so as to allow the knife transfer plate 12 to be extended. This extension of the knife transfer plate will push the knife at position 31b against the spring loaded rear edge rail 72 of the babbitt mold. This force will compress the springs and allow the knife and its babbitts to move in the forward direction as far as the compression of the springs acting on the rear edge rail 72 will permit. This movement of the knife and babbitts will shear the babbitts from the top and bottom of the mold as well as shear off the risers that filled the vent orifices 76 and pouring sprue opening 73. The transfer plate 12 is again shifted to its neutral position and the molding assembly 62 is raised to its position as seen in FIG. 12. Pins 86 are provided on the underside of the housing above the babbitt molds in order to remove any riser stems left in the vent orifices 76. When the mold assembly is raised, pins 86 protrude through the vent holes as the babbitt molding assembly 62 is raised. The removed riser stems will then fall to the machine below where the compressed air which was used to cool the newly poured babbitts blows these riser stems off the machine to remove them from interferring with operation of the machine. As a modification, such pins may be solenoid actuated and may be provided below the base plate 18 so as to protrude and then retract from the base plate 18 into the mold orifice openings from below where the mold assembly 62 is first lowered into position. With the mold assembly 62 in its raised position, the mold side rails 67 are extended by cylinder 70 in preparation for the next cycle and the cylinder 70 is shifted into neutral.

Cylinder 30 is now actuated to lower the locking pins 28 for shaving. The knife transfer plate 12 is extended until the locking pins 28 pop into the matching openings 23 in the transfer plate 12 to lock the transfer plate in position. This extension of the transfer plate 12 pushes the back edge of the knife babbitts over the edge 81 of the base plate into the position indicated at 31c. All of the back edges of the babbitts will be positioned precisely in the same position. The positioning of the knife in the shaving position 31c is further assisted by the friction roller 55 on the underside of the guide plate 51. As modifications, a magnetic base plate 18 or any other suitable structure for providing resistance could be used in position of the spring loaded friction roller to provide sufficient braking.

Cylinder 59 is actuated to lower the clamping blocks 54 to clamp the knife in position 31c to prevent any movement of the knife during the shaving operation. Also, the compressed air cooling valve is now automatically shut off.

The motor driven router 78 is then started and a vacuum hose attachment may be provided to suck up babbitt shavings. A feed screw motor is then started and causes the router to traverse along the shafts 80 across the back edges of the knife babbitts so that the router cutting bit 89 acting against these back edges provides knives wherein the overall width of the knife plus babbitt is constant. At the same time, any "nubs" remaining from where the riser stems were sheared off are also removed by the router because of their positioning at the back edge of the babbitt.

After the router has traversed across the entire length of the blade from one side of the housing 17 to the other the feed screw motor is stopped, the router is shut off and the vacuum is also shut off. The cylinder 59 is now actuated to raise the clamping blocks 54 to unclamp the knife. The knife transfer plate 12 is again shifted to neutral by opening both ports of the cylinder 13 to atmosphere. Cylinder 30 is also actuated to retract the locking pins for shaving and thereby permit extension of the knife transfer plate 12.

The transfer plate 12 is again actuated to now push the completely rebabbitted knife out the end of the machine over the base edge 81 onto the collecting structure provided therefor as described above.

The knife transfer plate 12 is now fully retracted and as the plate retracts rearwardly of the magazine 15 the next knife in the magazine will fall into position upon the base plate and be ready for processing.

One full process cycle has now been completed and this cycle will be automatically repeated until all the knives in the magzine have been processed or the machine is shut off.

It is to be noted that occasionally the front and rear edges of a knife are not parallel. This means that the babbitt on one side of the knife will be wider than the babbitt on the other side of the knife. However, this lack of parallelism will be compensated for by molding the babbitts into the proper dimensions in the manner as described above.

It is apparent that the power actuated cylinder 13 has a stroke of sufficient length to advance a knife from the rear edge of the feed magazine through the several work stations of punching, pouring and shaving and then out the forward end of the machine onto a chute or conveyor.

The present machine preferably primarily uses a logic system to control the sequence of operation of the several components of the machine. The primarily logic controlled system is preferred over, for example, a completely time sequential control, because it would more quickly and reliably ensure that the machine would not try to continue operating should some type of mechanical mishap, such as jamming of a part, occur. It is to be appreciated that such a logic control system requires the use of sensors, limit switches, various relays and timers in order to carry out properly the sequence of operations of the machine.

Instead of a number of separate power cylinders to actuate each stage of the machine, each stage could be connected by mechanical linkages to a single power source.

With the present machine it is possible to produce repeatedly knives having identical knife plus babbitt widths regardless of any variations in the widths of the knives per se. The resharpened knives are not dulled or damaged in any way by the several processing steps performed on the knives in the machine.

Thus it can be seen that the present invention has disclosed an apparatus for automatically removing babbitts from knives, forming new babbitts onto the knives, and trimming the new babbitts to the proper dimensions. This apparatus therefor avoids the laborious and time consuming process of manually carrying out these functions with respect to the knives. At the same time, the apparatus provides a cost and time effective system which is capable of 24 hour per day operation to produce sharpened knives with babbitts which are ready for installation in cutting machines. The present machine eliminates many previous dangers to personnel since once the knives are loaded in the magazine no further contact by humans with the knives are necessary until the knives are discharged from the machine.

It will be understood that this invention is susceptible to modification in order to adapt it to different usages and conditions, and accordingly, it is desired to comprehend such modifications within this invention as may fall within the scope of the appended claims.

What is claimed is:

1. In an apparatus for removing babbitts from knives to which babbitts have been attached for accurately positioning the knives in holders and the like, the combination of a frame, a magazine on said frame for storing a plurality of knives each having at least one babbitt attached thereon, means on said frame for transferring a knife from said magazine to a first predetermined position on said frame spaced from said magazine, and means on said frame for removing babbitts from said knife in said first predetermined position.

2. In an apparatus as claimed in claim 1 and further comprising means on said frame for retaining the transferred knife in said first predetermined position.

3. In an apparatus as claimed in claim 2 wherein said retaining means comprises spaced stops moveable upwardly into engagement with said knife to stop said knife in said first position.

4. In an apparatus as claimed in claim 2 and further comprising means on said frame for introducing air under pressure onto said knife in the vicinity of said babbitts to remove any moisture remaining on a knife.

5. In an apparatus as claimed in claim 1 and further comprising a base plate on said frame, said knife being transferred along said base plate.

6. In an apparatus as claimed in claim 1 wherein said babbitt removing means comprises means for applying a force to said babbitts so as to separate the babbitts from the knife.

7. In an apparatus as claimed in claim 6 wherein said force applying means comprises a vertically moveable punch having a shape corresponding to and smaller than slots in the knife for securing a babbitt to the knife.

8. In an apparatus as claimed in claim 1 and further comprising means on said frame defining a second predetermined position to which a knife from which babbitts have been removed is transferred by said transferring means, and means at said second predetermined position for forming at least one new babbitt on said knife.

9. In an apparatus as claimed in claim 5 and further comprising means on said frame for retaining said knife in said second predetermined position.

10. In an apparatus as claimed in claim 8 and further comprising means on said frame for defining a third predetermined position to which a knife on which at least a babbitt has been formed is transferred by said transferring means, and means for trimming the formed new babbitts on said knife.

11. In an apparatus as claimed in claim 10 wherein said first, second and third positions are spaced on said frame, said transferring means being movable linearly to transfer a knife to said positions.

12. In an apparatus as claimed in claim 10 wherein said babbitt trimming means comprises a cutting element positionable against an edge of said new babbitt to shave said babbitt edge so as to form a predetermined combined width of said knife and said new babbitt.

13. In an apparatus as claimed in claim 10 and further comprising a clamping means engageable with the upper surface of a knife in said third position for retaining said knife in said position, and means on said third-predetermined position defining means for braking said knife as it is being transferred to said third position to prevent movement of said knife past said third position.

14. In an apparatus as claimed in claim 8 and further comprising means for defining a mold against that portion of the knife from which a babbitt has been removed, and means for introducing a babbitt material into said mold to form a babbitt.

15. In an apparatus as claimed in claim 14 and further comprising means for supplying air under pressure to the formed babbitt to cool and thereby accelerate solidifying of the babbitt and to blow away scraps of babbitt material from the exterior of said mold.

16. In an apparatus as claimed in claim 14 and further comprising a base plate on said frame at said second position upon which said knife is advanced by said transfer means, said mold defining means comprising a U-shaped element having parallel side rails and a back edge member extending to ends of said side rails to define a closed end, said U-shaped element positioned upon said base plate and having an open end positioned against said portion of the knife at which a babbitt is to be formed.

17. In an apparatus as claimed in claim 16 wherein said base plate has a U-shaped recess therein to receive said U-shaped element whereby said base plate defines a bottom of the mold.

18. In an apparatus as claimed in claim 17 wherein said mold defining means has a head plate with an underside and said U-shaped element is slideably mounted on said underside of the head plate whereby said underside defines the top of the mold.

19. In an apparatus as claimed in claim 18 and further comprising means in said head plate for defining an opening through which liquid babbitt material is introduced into the mold.

20. In an apparatus as claimed in claim 18 wherein said head plate has at least one vent orifice therein.

21. In an apparatus as claimed in claim 20 and further comprising means on said base plate for removing riser stems from a said vent orifice.

22. In an apparatus as claimed in claim 16 wherein said back edge member is spring mounted for movement between said side rails.

23. In an apparatus as claimed in claim 1 in which said knifes are vertically stacked in said magazine.

24. In an apparatus as claimed in claim 23 wherein the lowermost of said vertically stacked knives is engageable by said transferring means and thereby transferred to a said predetermined position.

25. In an apparatus as claimed in claim 1 wherein said transferring means comprises a plate slideably mounted on said frame and movable to engage a knife in said storing means.

26. In an apparatus as claimed in claim 25 wherein said transferring means has a retracted position rearwardly of said storing mwans and is movable forwardly towards said storing means to a partially extended position.

27. In an apparatus as claimed in claim 26 wherein said plate has a forward edge with a bevel on the underside thereof, said knives each being disposed in said storing means with a cutting edge directed rearwardly and having a bevel on said cutting edge on the top thereof to be engaged by said plate forward edge.

28. In an apparatus for removing babbitts from knives to which babbitts have been attached for accurately positioning the knives in holders and the like, the combination of a frame, a base plate on said frame, a magazine on said frame capable of storing a plurality of knives each having babbitts attached thereon and a lower most one of said knives resting on said base plate, a transfer plate slideable on said base plate to engage said lower most knife and transfer said knife on a path to a predetermined first position, stops at said first position moveable into the path of knife, and a punch moveable toward the babbitts on a knife in said first position to apply a force to said babbitts so as to separate the babbitts from the knife.

29. A process for removing babbitts from knives to which babbitts have been attached for accurately positioning the knives in holders and the like comprising the steps of securing a knife which has at least one babbitt attached thereon in a predetermined position, applying a force against the babbitts on said knife to remove the babbitts therefrom, forming new babbitts onto said knife such that the combined width of the knife and new babbitt corresponds substantially to a predetermined distance, and trimming the new babbitt to the predetermined combined width of the knife and babbitt.

30. In a device for defining a mold against an edge of a knife blade and the like positioned upon a base plate comprising a head plate with an underside, a U-shaped element slideably mounted on said underside of the head plate such that said underside defines the top of the mold, said U-shaped element having parallel side rails and a back edge member extending to ends of said side rails to define a closed end, said U-shaped element positioned upon a base plate and having an open end positioned against said portion of the knife at which a mold is to be formed.

31. In a device as claimed in claim 30 wherein said back edge member is spring mounted for movement between said side rails.

* * * * *